United States Patent
Sung

(10) Patent No.: US 12,063,454 B2
(45) Date of Patent: Aug. 13, 2024

(54) ELECTRONIC DEVICE AND METHOD FOR TRANSMITTING VIDEO DATA AND AUDIO DATA

(71) Applicant: REALTEK SEMICONDUCTOR CORPORATION, Hsinchu (TW)

(72) Inventor: Lien-Hsiang Sung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 18 days.

(21) Appl. No.: 18/162,643

(22) Filed: Jan. 31, 2023

(65) Prior Publication Data

US 2023/0412761 A1 Dec. 21, 2023

(30) Foreign Application Priority Data

Jun. 20, 2022 (TW) .................................. 111122874

(51) Int. Cl.
*H04N 7/06* (2006.01)
*H04N 7/015* (2006.01)

(52) U.S. Cl.
CPC .............. *H04N 7/06* (2013.01); *H04N 7/015* (2013.01)

(58) Field of Classification Search
CPC ...... H04N 7/06; H04N 7/015; H04N 21/2368; H04N 21/242; H04N 21/43635; H04N 21/8547; H04N 5/04; G06F 3/165
See application file for complete search history.

(56) References Cited

U.S. PATENT DOCUMENTS

| | | | | |
|---|---|---|---|---|
| 2009/0268091 A1* | 10/2009 | Kouyama | ............... | H03L 7/183 348/E9.034 |
| 2009/0278984 A1* | 11/2009 | Suzuki | ................... | H04N 7/081 348/554 |
| 2011/0141354 A1* | 6/2011 | Katou | .................... | G09G 5/003 348/E5.009 |
| 2011/0211112 A1* | 9/2011 | Itani | ........................ | H04N 9/89 348/E7.004 |
| 2012/0182473 A1* | 7/2012 | Kim | ................... | H04N 21/4305 348/521 |
| 2013/0187483 A1* | 7/2013 | Slezak | .................... | H04L 12/00 307/125 |

(Continued)

FOREIGN PATENT DOCUMENTS

CN 105446696 A * 3/2016

*Primary Examiner* — Michael Lee
(74) *Attorney, Agent, or Firm* — WPAT, P.C.; Anthony King

(57) ABSTRACT

An electronic device includes a receiving unit, a signal processing unit, a transmitting unit, and an audio timing unit. The receiving unit receives audio data and first video data. The signal processing unit generates second video data and a pixel clock signal for playing the second video data according to the first video data. The transmitting unit transmits the second video data, the audio data, the pixel clock signal, and a cycle time stamp (CTS) to a receiver. The audio timing unit generates an internal reference signal adjusts a frequency of the internal reference signal according to a receiving speed of the audio data, and generates the CTS according to the internal reference signal and the pixel clock signal so that the receiver can generate an audio clock signal for playing the audio data according to the pixel clock signal and the CTS.

20 Claims, 6 Drawing Sheets

(56) References Cited

U.S. PATENT DOCUMENTS

| | | | | |
|---|---|---|---|---|
| 2014/0204269 A1* | 7/2014 | Sugiyama | ............... | H04N 5/06 |
| | | | | 348/512 |
| 2014/0218616 A1* | 8/2014 | Toba | ................. | H04N 21/4302 |
| | | | | 348/723 |
| 2015/0288919 A1* | 10/2015 | Labosco | ................ | H04N 19/44 |
| | | | | 348/445 |
| 2016/0100125 A1* | 4/2016 | Chiba | ..................... | H04N 5/77 |
| | | | | 386/210 |
| 2022/0094994 A1* | 3/2022 | Lin | ..................... | G09G 3/3611 |

\* cited by examiner

ELECTRONIC DEVICE AND METHOD FOR TRANSMITTING VIDEO DATA AND AUDIO DATA

CROSS-REFERENCE TO RELATED APPLICATIONS

This application claims priority of Taiwan application No. 111122874, filed on Jun. 20, 2022, which is incorporated by reference in its entirety.

TECHNICAL FIELD

The present application relates to an electronic device, particularly an electronic device for transmitting video and audio data.

BACKGROUND

High definition multimedia interface (HDMI) is a common display interface nowadays. According to the specifications of HDMI, the video data of each frame is transmitted in a line-by-line manner, and there is a specific blank time between each line and each frame, while the blank time is not used to transmit video data and can be used to transmit audio data. Since the transmitting terminal in the HDMI only sends the pixel clock signal for playing video data to the receiving terminal, the receiving terminal must regenerate the audio clock signal required for playing audio data based on the pixel clock signal.

According to the recommendations of the HDMI specifications, the receiving terminal can adjust the frequency of the pixel clock signal to generate the audio clock signal by using a frequency divider and a frequency multiplier. However, in such case, the circuitry of the divider and frequency multiplier is rather complex, and therefore the area of the circuit of the receiving terminal is increased. In addition, if the audio clock signal is reconstructed incorrectly, it may generate a burst sound at the receiving terminal. Therefore, how to effectively reconstruct the audio clock signal and avoid the accumulation of audio clock signal errors to ensure the quality of audio and video presentation is an issue to be solved in the related field.

SUMMARY OF THE INVENTION

One embodiment of the present disclosure discloses an electronic device. The electronic device includes a receiving unit, a signal processing unit, a transmitting unit, and an audio timing unit. The receiving unit is configured to receive a plurality of audio data and a plurality of first video data. The signal processing unit is configured to generate a plurality of second video data according to the plurality of first video data, and generate a pixel clock signal configured to play the plurality of second video data. The transmitting unit is configured to output the plurality of second video data, the plurality of audio data, the pixel clock signal and a cycle time stamp (CTS) to a receiving terminal, wherein a value obtained by dividing the frequency of the pixel clock signal by the CTS equals to a value obtained by dividing the frequency of an audio reference clock signal at the receiving terminal configured to play the plurality of audio data by a preset multiple. The audio timing unit includes a reference signal generator and a controller. The reference signal generator is configured to generate an internal reference signal. The controller is configured to adjust a frequency of the internal reference signal according to a speed at which the plurality of audio data is transmitted, and generate the CTS according to the preset multiple, the internal reference signal and the pixel clock signal.

Another embodiment of the present disclosure discloses a method for transmitting video data and audio data. The method includes receiving a plurality of audio data and a plurality of first video data, generating a plurality of second video data according to the plurality of first video data and generating a pixel clock signal configured to play the plurality of second video data, generating an internal reference signal, adjusting a frequency of the internal reference signal according to a speed at which the plurality of audio data is transmitted, generating a cycle time stamp (CTS) according to a preset multiple, the internal reference signal and the pixel clock signal, and outputting the plurality of second video data, the plurality of audio data, the pixel clock signal and the CTS to a receiving terminal, wherein a value obtained by dividing the frequency of the pixel clock signal by the CTS equals to a value obtained by dividing the frequency of an audio reference clock signal at the receiving terminal configured to play the plurality of audio data by the preset multiple.

DETAILED DESCRIPTION

Figure 1:
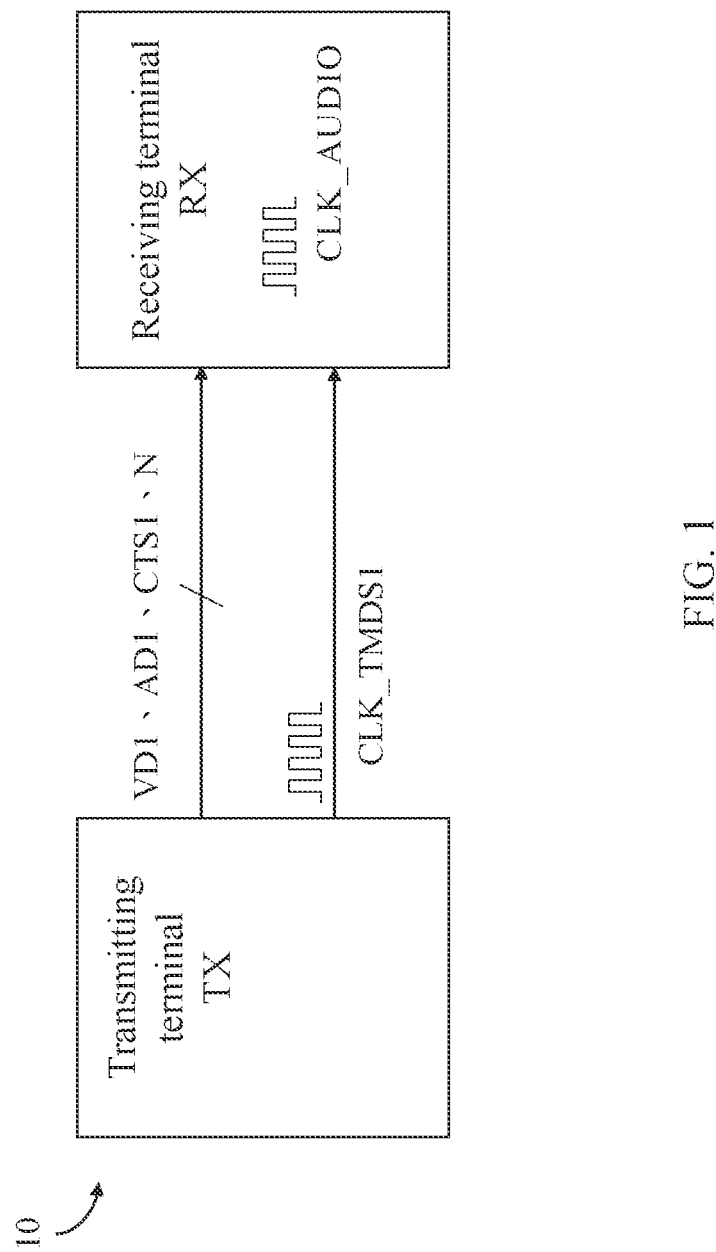
FIG. 1 is a schematic diagram illustrating a data transmission system according to embodiments of the present disclosure.

FIG. 1 is a schematic diagram illustrating a data transmission system 10 according to embodiments of the present disclosure. The data transmission system 10 includes a transmitting terminal TX and a receiving terminal RX, and the transmitting terminal TX can be coupled to the receiving terminal RX through a high definition multimedia interface (HDMI). As shown in FIG. 1, the transmitting terminal TX can transmit a plurality of video data VD1 and a plurality of audio data AD1 to the receiving terminal RX so that the video and audio content of the video data VD1 and the audio data AD1 can be played through the receiving terminal RX.

When transmitting data through the HDMI, the transmitting terminal TX, in addition to sending the video data VD1 to the receiving terminal RX, also transmits the pixel clock signal CLK_TMDS1 for playing the video data VD1 to the receiving terminal RX, so that the receiving terminal RX can play the video data VD1 accurately. However, during the transmission process using the HDMI, the transmitting terminal TX does not additionally transmit the audio clock signal for playing the audio data AD1 to the receiving terminal RX, and generally, the receiving terminal RX reconstructs an audio clock signal CLK_AUDIO for playing the audio data AD1 on its own according to the pixel clock signal CLK_TMDS1. In order to allow the receiving terminal RX to reconstruct the audio clock signal CLK_AUDIO, the transmitting terminal TX additionally transmits a cycle time stamp (CTS) CTS1 and a preset multiple N that are related to both the pixel clock signal CLK_TMDS1 and the audio clock signal CLK_AUDIO to the receiving terminal RX. According to the HDMI specification, the relationship of the frequency $f_{CLK\_A}$ of the audio clock signal CLK_AUDIO and the frequency $f_{CLK\_T}$ of the pixel clock signal CLK_TMDS1 can be expressed as equation (1).

$$f_{CLK\_A} = N/CTS1 * f_{CLK\_T} \quad \text{Formula (1)}$$

Consequently, according to equation (1), the receiving terminal RX can, after receiving the pixel clock signal CLK_TMDS1, use the value of the cycle time stamp CTS1 and multiple N to perform the frequency division operation and the frequency multiplication operation on the pixel clock signal CLK_TMDS1 so as to generate the audio clock signal CLK_AUDIO for playing the audio data AD1.

However, the frequency division operation and the frequency multiplication operation require the frequency divider and frequency multiplier that have complex structures, which in turn increases the circuit area required for the receiving terminal RX. Moreover, in some applications, other electronic devices for buffering or signal processing may be optionally disposed between the transmitting terminal TX and the transmitting terminal RX; in such scenario, if there is a minor error between the pixel clock signal generated by the electronic device and the pixel clock signal CLK_TMDS1 frequency generated by the transmitting terminal TX, a burst of sound may occur in the receiving terminal RX as a result of the gradual accumulation of errors.

Figure 2:
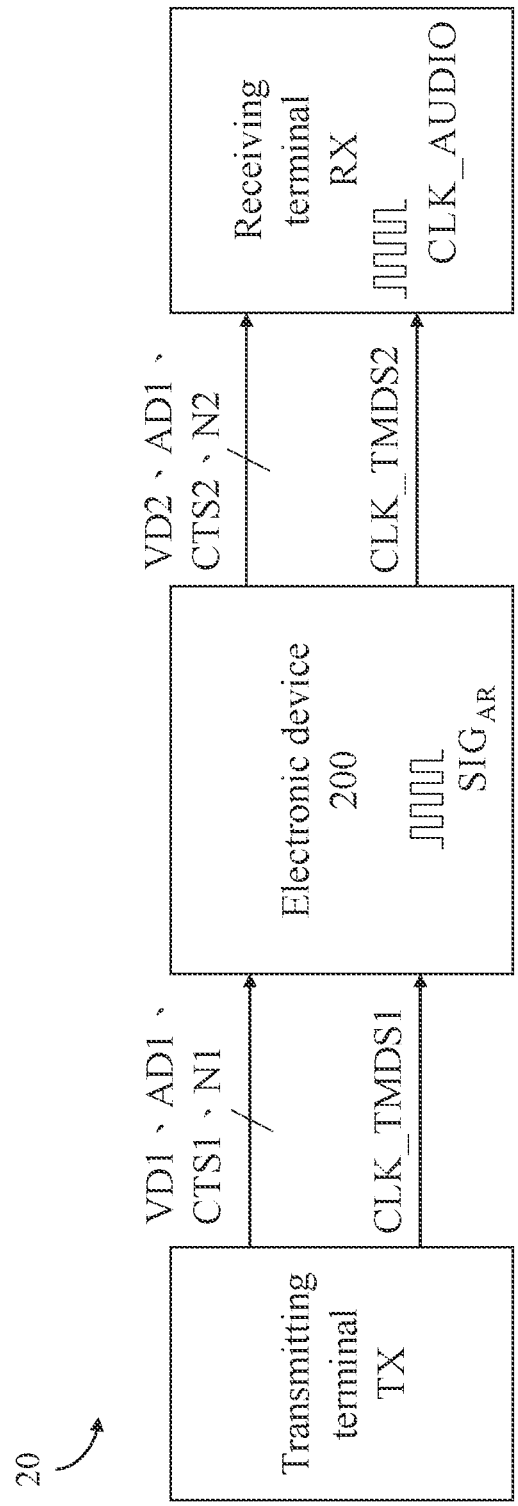
FIG. 2 is a schematic diagram illustrating a data transmission system according to another embodiment of the present disclosure.

FIG. 2 is a schematic diagram illustrating a data transmission system 20 according to another embodiment of the present disclosure. In the present embodiment, the data transmission system 20 can include a transmitting terminal TX, an electronic device 200 and a receiving terminal RX, and the electronic device 200 can be coupled to the transmitting terminal TX and the receiving terminal RX through an HDMI. The electronic device 200 can receive a plurality of video data VD1 and a plurality of audio data AD1 transmitted from the transmitting terminal TX, and can process or buffer the video data VD1, and then transmit the audio data AD1 and the processed or buffered video data VD2 to the receiving terminal RX. For example, the transmitting terminal TX can be a computer, set-top box, game console or other video devices configured to provide video and audio contents, the receiving terminal RX can be a television or display configured to display images and play audio, whereas the electronic device 200 can be a docking providing the buffer function or a processor for increasing the image quality or resolution.

In the present embodiment, the transmitting terminal TX can transmit the video data VD1 and the pixel clock signal CLK_TMDS1 for playing the video data VD1 to the electronic device 200, whereas the electronic device 200, after processing or buffering the video data VD1, can generate the video data VD2, and then also transmit the pixel clock signal CLK_TMDS2 for playing the video data VD2 to the receiving terminal RX at the same time when transmitting the video data VD2 to the receiving terminal RX.

Furthermore, as discussed above, during the transmission process using the HDMI, to allow the circuit receiving the video data VD1 and the audio data AD1 to be able to re-generate the audio clock signal CLK_AUDIO according to the pixel clock signal CLK_TMDS1, the transmitting terminal TX also transmits cycle time stamp CTS1 and a preset multiple N1 to the electronic device 200.

In some applications, the pixel clock signal CLK_TMDS2 generated by the electronic device 200 and the pixel clock signal CLK_TMDS1 generated by the transmitting terminal TX have substantially the same frequency, thus the electronic device 200 can directly transmit the cycle time stamp CTS1 transmitted from the transmitting terminal TX and the preset multiple N1 to the receiving terminal RX. In such case, according to equation (1), the receiving terminal RX can, after receiving the pixel clock signal CLK_TMDS2, use the value of the cycle time stamp CTS1 and the preset multiple N1 to perform the frequency division operation and frequency multiplication operation on the pixel clock signal CLK_TMDS2 so as to generate the audio clock signal CLK_AUDIO for playing the audio data AD1. However, if errors of the electronic components in the electronic device 200 cause the actual frequency of the pixel clock signal CLK_TMDS2 to be not exactly the same as the frequency of the pixel clock signal CLK_TMDS1, then the receiving terminal RX may generate a burst of sound after the errors have accumulated for a period of time when the audio clock signal CLK_AUDIO is regenerated according to the pixel clock signal CLK_TMDS2.

To solve this issue, the electronic device 200 of the present disclosure can internally generate the internal reference signal $SIG_{AR}$ with the same frequency as the audio clock signal CLK_AUDIO, set the preset multiple N2 by itself, and then calculate the cycle time stamp CTS2 according to the preset multiple N2 and the multiplication relationship between the internal reference signal $SIG_{AR}$ and the pixel clock signal CLK_TMDS2. When the electronic device 200 transmits the video data VD2 and the audio data AD1 to the receiving terminal RX, the electronic device 200 can also transmit the pixel clock signal CLK_TMDS2, the cycle time stamp CTS2 and the preset multiple N2 to the receiving terminal RX at the same time. Since the relationship among the audio clock signal CLK_AUDIO, the pixel clock signal CLK_TMDS2, the cycle time stamp CTS2 and the preset multiple N2 is still as shown in equation (1), the receiving terminal RX can reconstruct the audio clock signal CLK_AUDIO based on the cycle time stamp CTS2 and the preset multiple N2 when the pixel clock signal CLK_TMDS2 is received. In some embodiments, the preset multiple N2 of the electronic device 200 may be the same as or different from the preset multiple N1 of the transmitting terminal TX.

Moreover, in some embodiments, the electronic device 200 can perform image processing on the video data VD1 to generate the video data VD2 with a higher resolution; in such case, the frequency of the pixel clock signal CLK_TMDS2 for playing the video data VD2 can be higher than the frequency of the pixel clock signal CLK_TMDS1 for playing the video data VD1 that is received from the transmitting terminal TX. However, since the electronic device 200 can re-generate the corresponding the cycle time stamp CTS2 according to the pixel clock signal CLK_TMDS2, even though the frequency of the pixel clock signal CLK_TMDS2 differs from the frequency of the pixel clock signal CLK_TMDS1, the receiving terminal RX can still construct the correct audio clock signal CLK_AUDIO according to the pixel clock signal CLK_TMDS2 and the cycle time stamp CTS2 transmitted from the electronic device 200.

Figure 3:
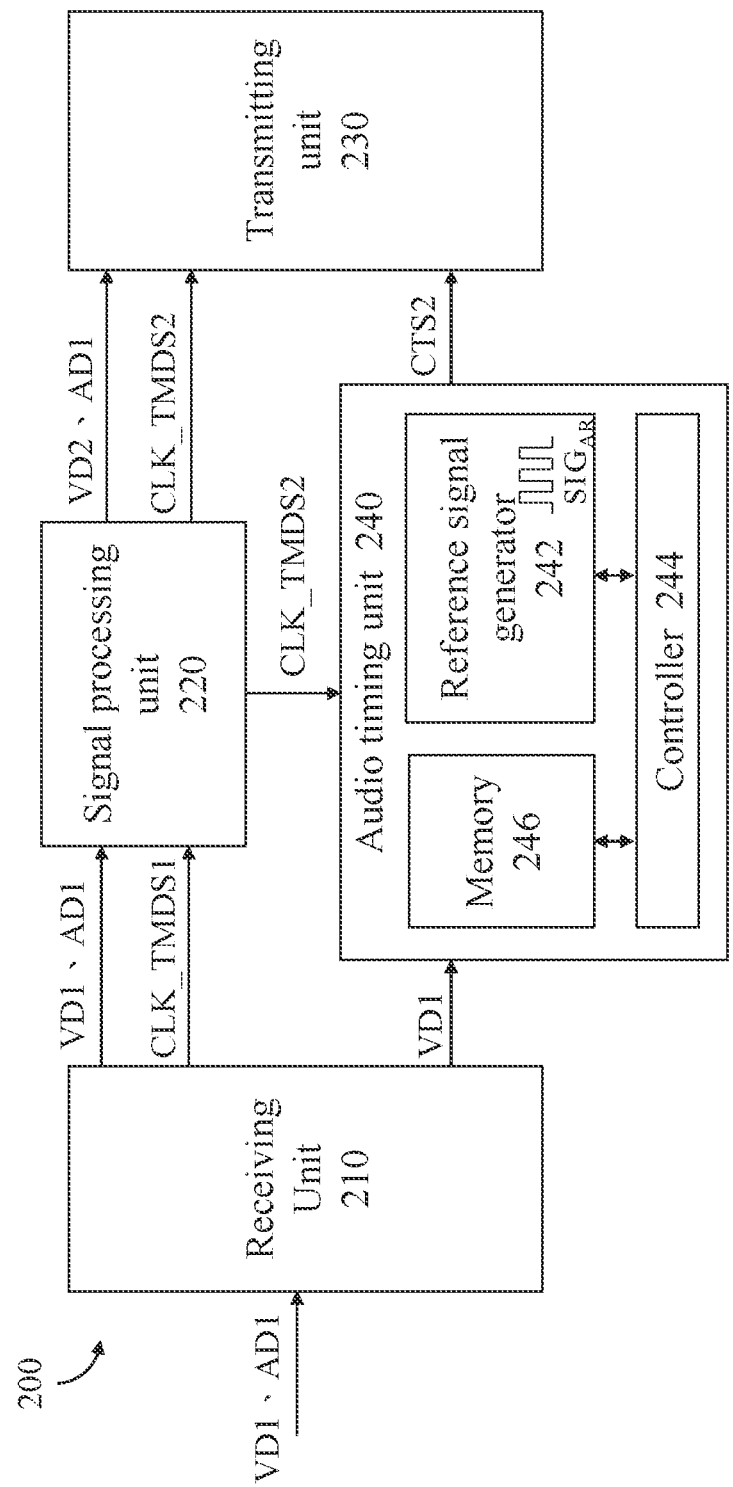
FIG. 3 is a schematic diagram illustrating an electronic device according to embodiments of the present disclosure.
Figure 4:
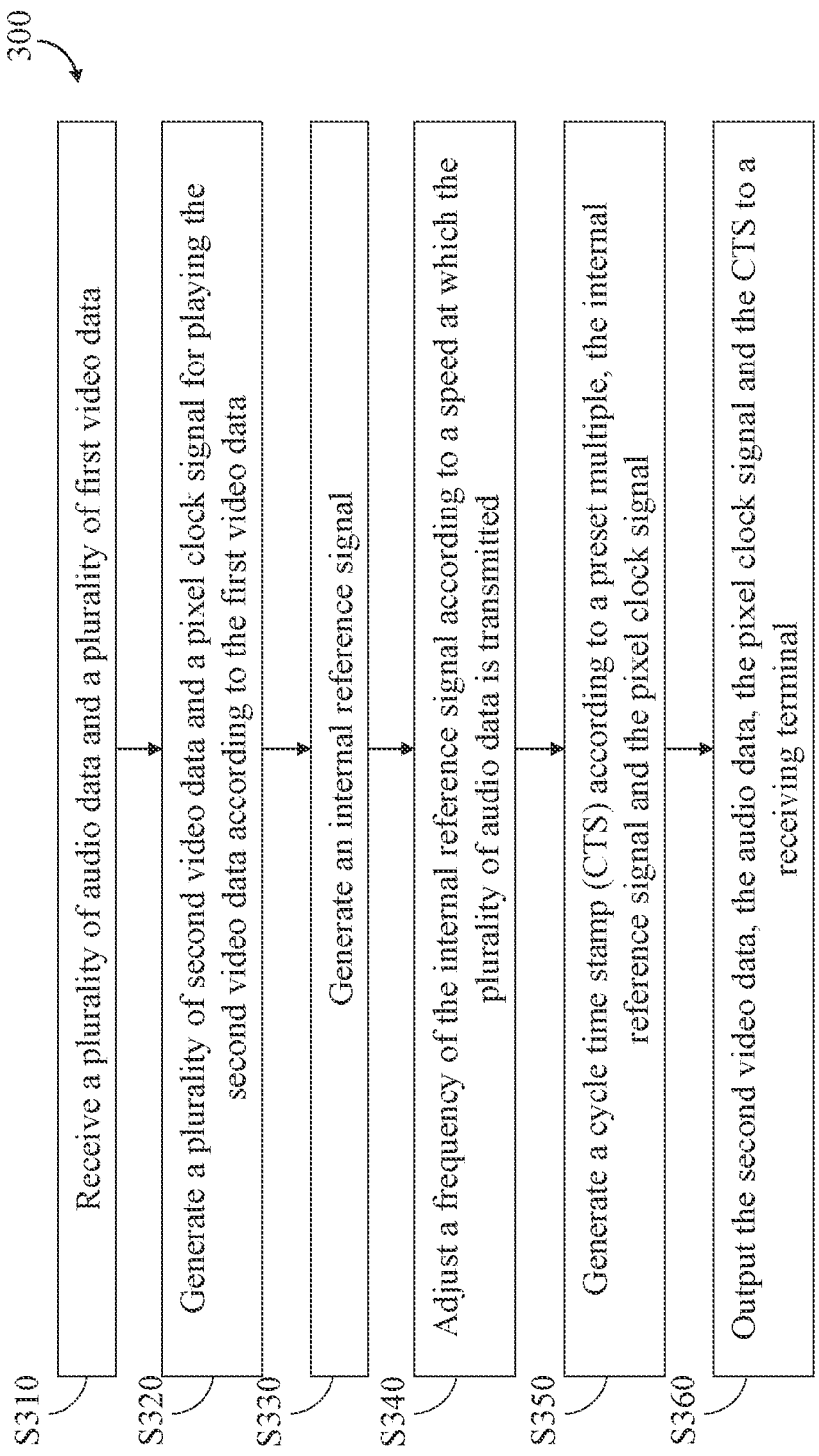
FIG. 4 is a flowchart illustrating a method for transmitting video data and audio data according to embodiments of the present disclosure.

FIG. 3 is a schematic diagram illustrating an electronic device 200 according to embodiments of the present disclosure. As shown in FIG. 3, the electronic device 200 can include a receiving unit 210, a signal processing unit 220, a transmitting unit 230 and an audio timing unit 240. FIG. 4 is a flowchart illustrating a method 300 for transmitting video data and audio data according to embodiments of the present disclosure. In the present embodiment, the method 300 can include Steps S310-S360, and the method 300 can be performed with the electronic device 200.

In Step S310, the receiving unit 210 can receive a plurality of audio data AD1 and a plurality of video data VD1. Next, in Step S320, the signal processing unit 220 can generate a plurality of second video data VD2 and the pixel clock signal CLK_TMDS2 for playing the second video data VD2 according to a plurality of video data VD1. In Step S330 to Step S350, the audio timing unit 240 can generate the cycle time stamp CTS2 corresponding to the pixel clock signal CLK_TMDS2, so that the receiving terminal RX can re-generate the audio clock signal CLK_AUDIO according to the pixel clock signal CLK_TMDS2 and the cycle time stamp CTS2.

As shown in FIG. 3, the audio timing unit 240 can include a reference signal generator 242 and a controller 244. In Step S330, the reference signal generator 242 can generate an internal reference signal $SIG_{AR}$. In the present embodiment, the frequency of the internal reference signal $SIG_{AR}$ is the frequency of the audio clock signal CLK_AUDIO estimated by the electronic device 200. In general, although the frequency of the audio clock signal CLK_AUDIO for playing the audio data AD1 may vary somewhat over time, it still be centered primarily on a specific frequency and vary up or down from the center frequency. Thus, in some embodiments, in Step S330, the reference signal generator 242 can set the frequency of the internal reference signal $SIG_{AR}$ according to the center frequency of the possible audio clock signal CLK_AUDIO. For example, if the center frequency of the audio clock signal CLK_AUDIO is estimated to be 4.096 MHz, the controller 244 can have the reference signal generator 242 generate an internal reference signal $SIG_{AR}$ with a frequency of 4.096 MHz. In some embodiments, the reference signal generator 242 can include a phase-locked loop and can use the phase-locked loop to generate the internal reference signal $SIG_{AR}$ having the required frequency.

In Step S340, after generating the internal reference signal $SIG_{AR}$, the controller 244 can further adjust the frequency of the internal reference signal $SIG_{AR}$ according to the reception condition of the audio data AD1, so that the frequency of the internal reference signal $SIG_{AR}$ can be kept closed to the appropriate frequency of the audio clock signal CLK_AUDIO. The detail for adjusting the frequency of the internal reference signal $SIG_{AR}$ in Step S340 will be explained in detail in the following paragraphs.

In the present embodiment, the transmitting terminal TX generates a plurality of audio data AD1 according to a fixed sample rate, and the appropriate frequency of the audio clock signal CLK_AUDIO is the product of the sampling frequency and a sample multiple K, wherein K is a positive integer. In such case, for every K cycles of the audio clock signal CLK_AUDIO, the receiving terminal RX will correspondingly play one audio data AD1. For example, the value of K can be 128, that is, the frequency of the audio clock signal CLK_AUDIO can be for example (but not limited to) 128 times the sampling frequency of the audio data AD1. In such case, the receiving terminal RX will play one audio data AD1 every K cycles (e.g., 128 cycles) of the audio clock signal CLK_AUDIO (in a dual-channel application, since there will be one audio data each for the left and right channels at the same time, the receiving terminal RX will play two audio data AD1 every 128 cycles of the audio clock signal CLK_AUDIO, i.e. one for the left and one for the right channel).

Although the transmitting terminal TX generates the audio data AD1 according to a fixed sample rate, the frequency at which the transmitting terminal TX actually transmits the audio data AD1 can vary over time because the transmitting terminal TX can only transmit the audio data AD1 when there is no transmission of the video data VD1; therefore, the electronic device 200 cannot directly consider the frequency at which the audio data AD1 is transmitted as the sampling frequency of the audio data AD1. However, during a longer period, the average frequency at which the transmitting terminal TX transmits the audio data AD1 should still be quite close to the sample rate of the audio data AD1.

In the present embodiment, the electronic device 200 can temporarily store the audio data AD1 transmitted from the transmitting terminal TX to the memory 246 in a first-in-first-out manner, and after a period of time when the audio data AD1 has occupied a predetermined capacity of the memory 246, one entry of audio data is retrieved from the memory 246 every K cycles (e.g., 128 cycles) of the internal reference signal $SIG_{AR}$. In such case, if the frequency of the internal reference signal $SIG_{AR}$ is sufficiently accurately, then on average, the frequency at which the audio data AD1 is stored into the memory 246 will be very close to the frequency at which the audio data AD1 is retrieved from the memory 246; that is, both should be highly close to the sample rate of the audio data AD1. Thus, the amount of the audio data AD1 temporarily stored in the memory 246 will be maintained within a specific range without continuously increasing or decreasing.

However, if the frequency of the internal reference signal $SIG_{AR}$ is not accurate, then after a period of time, the capacity that the audio data AD1 occupies in the memory 246 can increase or decrease gradually. For example, if the capacity that the audio data AD1 occupies in the memory 246 increases gradually, it may mean that the frequency of the internal reference signal $SIG_{AR}$ is lower than the appropriate frequency of the audio clock signal CLK_AUDIO, causing the speed that the controller 244 removes the audio data AD1 from the memory 246 to be lower than the speed that the newly received audio data AD1 are stored to the memory 246. In such case, the controller 244 may increase the frequency of the internal reference signal $SIG_{AR}$ when the audio data AD1 occupies more than a predetermined capacity upper limit of the memory 246. In contrast, if the capacity of memory 246 occupied by the audio data AD1 gradually decreases, it may mean that the frequency of the internal reference signal $SIG_{AR}$ is higher than the appropriate frequency of the audio clock signal CLK_AUDIO, causing the speed that controller 244 removes the audio data AD1 from the memory 246 to be higher than the speed that the newly received audio data AD1 are stored to the memory 246. In such case, when the capacity of the memory 246 occupied by the audio data AD1 is less than a predetermined lower capacity, the controller 244 can reduce the frequency of the internal reference signal $SIG_{AR}$.

For example, if the memory 246 has a capacity to store 200 entries of audio data AD1, then the controller 244 can begin to remove one audio data from the memory 246 every 128 cycles of the internal reference signal $SIG_{AR}$ (or two entries of audio data in the case of a dual-channel application) after storing 100 entries of audio data AD1. The controller 244 continuously monitors the capacity of the memory 246, and when more than 120 entries of audio data are stored in the memory 246, the controller 244 can determine that the capacity of the memory 246 has exceeded the upper capacity (i.e., the value of the upper capacity is predetermined to be 120) and increase the frequency of the internal reference signal $SIG_{AR}$ accordingly. In contrast, when less than 80 entries of audio data are stored in the memory 246, the controller 244 can determine that the capacity of the memory 246 has fallen below the lower capacity (i.e., the value of the lower capacity is predetermined to be 80) and reduce the frequency of the internal reference signal $SIG_{AR}$ correspondingly. Consequently, the controller 244 can dynamically adjust the frequency of the internal reference signal $SIG_{AR}$ according to the speed of receiving audio data AD1, so as to ensure that the frequency of the internal reference signal $SIG_{AR}$ is close to the appropriate frequency of the audio clock signal CLK_AUDIO.

In Step S350, after generating the internal reference signal $SIG_{AR}$ having the appropriate frequency, the controller 244 can further generate the cycle time stamp CTS2 according to the preset multiple N2 and the relationship between the internal reference signal $SIG_{AR}$ and the pixel clock signal CLK_TMDS2, and in Step S360, the transmitting unit 230 can output the cycle time stamp CTS2 together with the video data VD2, the audio data AD1 and pixel clock signal CLK_TSMD2 to the receiving terminal RX.

In the present embodiment, the memory 246 may be, for example, a dynamic random access memory (DRAM), and in such case, the audio timing unit 240 may dispose the memory 246 externally and select an appropriate size of DRAM according to the demand, thereby allowing more design flexibility. However, in some other embodiments, the memory 246 may also be a static random access memory (SRAM) disposed inside the audio timing unit 240. In such case, the controller 244 is able to access the memory 246 more quickly, but the designer may have to determine the capacity of the memory 246 in advance when designing the audio timing unit 240, and it would be difficult to expand the capacity of the memory 246 afterwards.

In the foregoing embodiments, the audio timing unit 240 uses the memory 246 to temporarily store the audio data AD1, and estimate the relationship between the frequency of the internal reference signal $SIG_{AR}$ and the sample rate of the audio data AD1 according to the change in the capacity of the memory 246, thereby adjusting the frequency of the internal reference signal $SIG_{AR}$ in Step S340. However, the present disclosure is not limited thereto. In some embodiments, the audio timing unit 240 may also use other means to determine the relationship between the frequency of the internal reference signal $SIG_{AR}$ and the sample rate of the audio data AD1, and increase the frequency of the internal reference signal $SIG_{AR}$ when the frequency of the internal reference signal $SIG_{AR}$ is less than the product of the sample rate of the audio data AD1 and a sample multiple (e.g., 128); and decrease the frequency of the internal reference signal $SIG_{AR}$ when the frequency of the internal reference signal $SIG_{AR}$ is greater than the product of the sample rate of the audio data AD1 and the sample multiple. For example, instead of using the memory, the audio timing unit 240 may determine the relationship between the frequency of the internal reference signal $SIG_{AR}$ and the sample rate of the audio data AD1 by counting.

Figure 5:
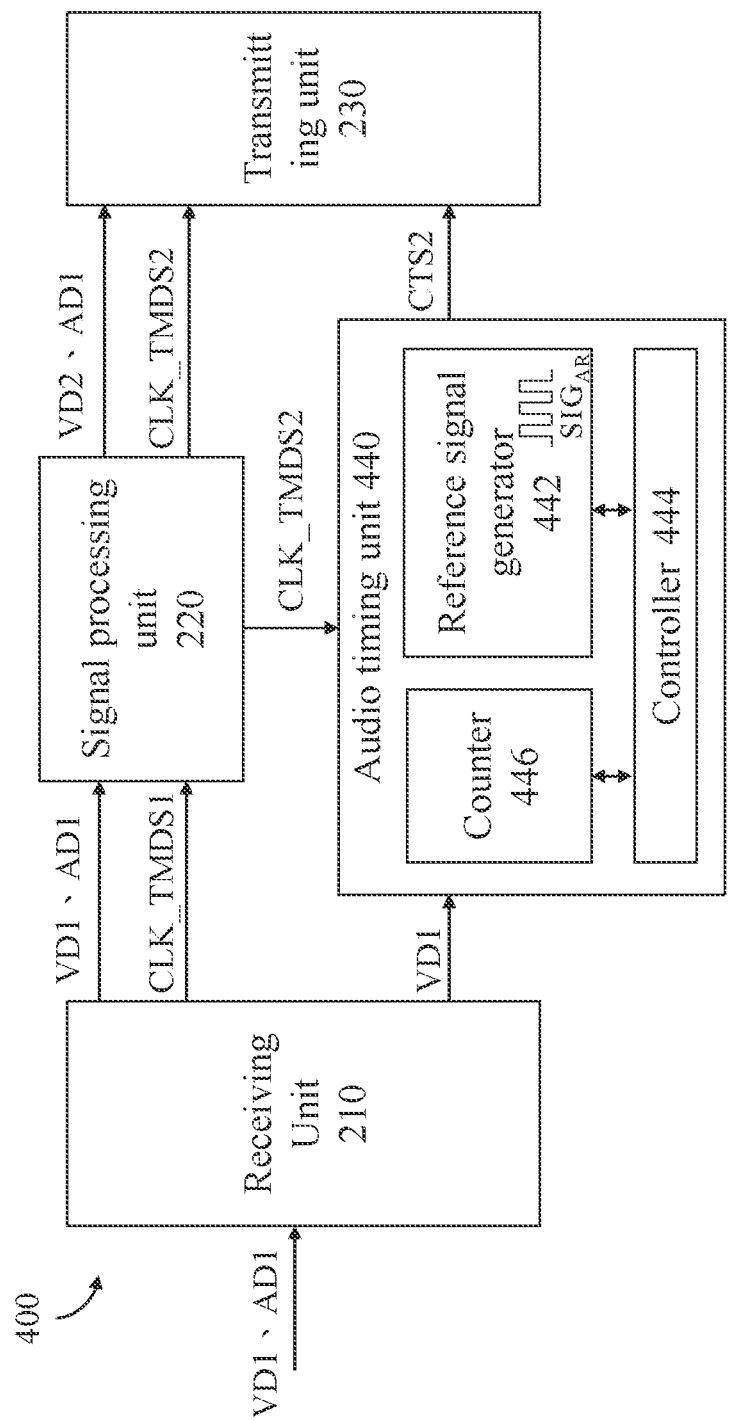
FIG. 5 is a schematic diagram illustrating an electronic device according to another embodiment of the present disclosure.

FIG. 5 is a schematic diagram illustrating an electronic device 400 according to another embodiment of the present disclosure. The electronic device 400 includes a receiving unit 210, a signal processing unit 220, a transmitting unit 230 and an audio timing unit 440. The electronic device 400 and the electronic device 200 have similar structures and both can be used to perform the method 300. However, the electronic device 400 differs from the electronic device 200 in that the audio timing unit 440 of the electronic device 400 can include a counter 446 and does not include a memory.

As shown in FIG. 5, the audio timing unit 440 can include a reference signal generator 442, a counter 446 and a controller 444. In the present embodiment, the audio timing unit 440 does not temporarily store the received audio data store in the memory but can use the counter 446 to simulate a virtual memory occupation condition, such that the controller 444 can correspondingly adjust the frequency of the internal reference signal $SIG_{AR}$.

For example, when using the audio timing unit 440 to perform Step S340, the audio timing unit 440 can increase the value of the counter 446 by one every time after the receiving unit 210 receives an entry of the audio data AD1. After the value of the counter 446 reaches a predetermined value, the controller 444 can decreases the value of the counter 446 by one every K cycles (for example, K can be 128) of the internal reference signal $SIG_{AR}$. In other words, the value of the counter 446 can be considered as the capacity of a virtual memory, and when the value of the counter 446 is increased by one, it means that one entry of audio data is stored in the virtual memory, whereas when the value of the counter 446 is decreased by one, it means that one entry of audio data is retrieved from the virtual memory. In such case, when the frequency of the internal reference signal $SIG_{AR}$ equals to the appropriate frequency of the audio clock signal CLK_AUDIO, the capacity that the audio data occupies in the virtual memory should be kept in a specific range without continuously increasing or decreasing.

When the value of the counter 446 is greater than the predetermined upper limit, it means that the audio data AD1 are stored to the virtual memory at a speed higher than the speed of retrieving the audio data AD1 from the virtual memory; in such scenario, the frequency of the internal reference signal $SIG_{AR}$ may be lower than the appropriate frequency of the audio clock signal CLK_AUDIO; thus, the controller 444 can correspondingly increase the frequency of the internal reference signal $SIG_{AR}$. In contrast, when the value of the counter 446 is less than the predetermined lower limit, it means that the audio data AD1 are stored to the virtual memory at a speed lower than the speed of retrieving the audio data AD1 from the virtual memory; in such scenario, the frequency of the internal reference signal $SIG_{AR}$ can be higher than the appropriate frequency of the audio clock signal CLK_AUDIO; thus, the controller 444 can correspondingly decrease the frequency of the internal reference signal $SIG_{AR}$. In some embodiments, the predetermined upper limit can be greater than a predetermined value, and the predetermined value can be greater than the predetermined lower limit; for example, the predetermined value can be 100, the predetermined upper limit can be 120, and the predetermined lower limit can be 80.

Moreover, in some embodiments, after the controller 444 adjusts the frequency of the internal reference signal $SIG_{AR}$, it may take a certain period of time for the value of the counter 446 to gradually return to the interval between the predetermined lower limit and the predetermined upper limit. In such case, if the controller 444 continuously increases or decreases the frequency of the internal reference signal $SIG_{AR}$ before the value of the counter 446 returns to the said interval, the swing of the frequency of the internal reference signal $SIG_{AR}$ may become too large to approach the appropriate frequency of the audio clock signal CLK_AUDIO. To address such issue, in the present embodiment, after the controller 444 determines to increase the frequency of the internal reference signal $SIG_{AR}$, and the controller 444 may see if the value of the counter has decreased and then determine whether to further increase the frequency of the internal reference signal $SIG_{AR}$ or not.

For example, if the value of the counter does not decrease even after the controller 444 increases the frequency of the internal reference signal $SIG_{AR}$, then the controller 444 can increase the frequency of the internal reference signal $SIG_{AR}$ again. On the other hand, if the value of the counter 466 has decreased after the controller 444 increases the frequency of the internal reference signal $SIG_{AR}$, then even though the value of the counter 446 is still greater than the predetermined upper limit, the controller 444 may not immediately increase the frequency of the internal reference signal $SIG_{AR}$. In contrast, the controller 444 can decrease the frequency of the internal reference signal $SIG_{AR}$ again if the value of the counter does not increase after decreasing the frequency of the internal reference signal $SIG_{AR}$. On the other hand, the controller 444 may not immediately decrease the frequency of the internal reference signal $SIG_{AR}$, if the value of the counter 446 has increased after the controller 444 decreases the frequency of the internal reference signal $SIG_{AR}$, even though the value of the counter 446 is still less than the predetermined lower limit. As a result, it is possible to avoid the controller 444 from over-adjusting the frequency of the internal reference signal $SIG_{AR}$, ensuring that the frequency of the internal reference signal $SIG_{AR}$ can approach the appropriate frequency of the audio clock signal CLK_AUDIO.

Furthermore, in some embodiments, since the internal reference signal $SIG_{AR}$ is not actually for playing the clock signal of the audio data AD1, the requirement for the waveforms quality is rather lower. In other words, it suffices as long as the audio timing unit 440 can make the frequency of the internal reference signal $SIG_{AR}$ approach the appropriate frequency of the audio clock signal CLK_AUDIO, whether each cycle of the internal reference signal $SIG_{AR}$ is exactly the same will not affect the subsequent calculation of the of the cycle time stamp CTS2. In such case, the reference signal generator 442 can also be implemented in a logic circuit instead of using a phase-locked loop. Since the circuit of the phase-locked loop is more complex and requires a larger circuit area, implementing the reference generator 442 with a logic circuit can also reduce the circuit area required for the electronic device 400.

Figure 6:
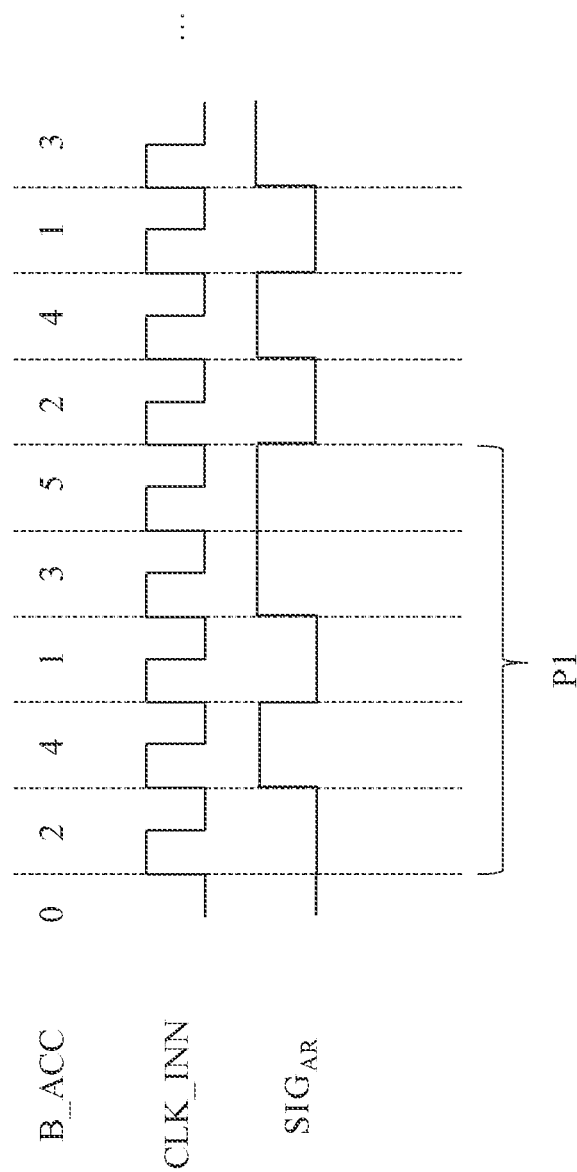
FIG. 6 is a schematic diagram illustrating the reference signal generator FIG. generating an internal reference signal.

For example, in order to enable the internal digital circuit for operation, the electronic device 400 may generate the internally required clock signal CLK_INN (shown in FIG. 6). In such case, if the ratio of the frequency of the internal clock signal CLK_INN and the frequency of the internal reference signal $SIG_{AR}$ are known, the controller 444 can generate the internal reference signal $SIG_{AR}$ according to internal clock signal CLK_INN.

In the present embodiment, the controller 444 can use the internal clock signal CLK_INN to estimate a period of detection time, and calculate the amount of the audio data AD1 that the receiving unit 210 receives during such detection time. For example, if 250 cycles of the internal clock signal CLK_INN happens to be one microsecond, then the controller 444 can, for example, may set the detection time as 250 times $2^{17}$ cycles of the internal clock signal CLK_INN, that is, 131.072 microseconds. During the detection time of 131.072 microseconds, if the receiving unit 210 receives 4194 entries of the audio data AD1, it means that the corresponding the audio clock signal CLK_AUDIO should have passed (4194×K) cycles during this period. If K is 128, then the frequency ratio of the internal clock signal CLK_INN and the internal reference signal $SIG_{AR}$ is (250× $2^{10}$):4194.

After obtaining the frequency ratio between the internal clock signal CLK_INN and the internal reference signal $SIG_{AR}$, the reference signal generator 442 can generate the internal reference signal $SIG_{AR}$ according to the ratio and internal clock signal CLK_INN. For example, if the frequency ratio of the internal clock signal CLK_INN and the internal reference signal $SIG_{AR}$ is A:B, then the reference signal generator 442 can set a level indication value and increase the level indication value by B for each cycle of the internal clock signal CLK_INN starting from 0. When the accumulation result of the level indication value is greater than A, the reference signal generator 442 can subtract A from the accumulated result. Every time after the level indication value is updated, the reference signal generator 442 can further compare the value of the level indication value and A/2, and when the level indication value is greater than or equals to A/2, the internal reference signal $SIG_{AR}$ is set as the logic high level, whereas when the level indication value is less than A/2, the internal reference signal $SIG_{AR}$ is set as the logic low level. As a result, the internal reference signal $SIG_{AR}$ will periodically switch between the logic high level and the logic low level, and the frequency ratio of the internal clock signal CLK_INN and the internal reference signal $SIG_{AR}$ would be A:B on average over a period of time.

FIG. 6 is a schematic diagram illustrating the reference signal generator 442 for generating an internal reference signal $SIG_{AR}$. In the embodiment of FIG. 6, the frequency ratio of the internal clock signal CLK_INN and the internal reference signal $SIG_{AR}$ is 5:2. In such case, the reference signal generator 442 increases the level indication value B_ACC by 2 after every cycle of the internal clock signal CLK_INN. Thus, B_ACC is sequentially accumulated from 0 to 2 and 4, and when the accumulated result of the level indication value B_ACC is greater than 5, the reference signal generator 442 can subtract 5 from the accumulated result. Thus, as shown in FIG. 6, the value of the level indication value B_ACC will be sequentially updated as 0, 2, 4, 1, 3, 5, 2 . . . .

After each update of the level indication value B_ACC, the reference signal generator 442 can further compare the value of the level indication value B_ACC and A/2 (which is 2.5 in the present embodiment). When the level indication value B_ACC is greater than or equals to 2.5, the internal reference signal $SIG_{AR}$ is set as a logic high level, whereas when the level indication value B_ACC is less than 2.5, the internal reference signal $SIG_{AR}$ is set as a logic low level. Consequently, as shown in FIG. 6, within a period P1 consisting of 5 cycles of the internal clock signal CLK_INN, there are 2 cycles of the internal reference signal $SIG_{AR}$, that is, the frequency ratio of the internal clock signal CLK_INN and the internal reference signal $SIG_{AR}$ is 5:2. Moreover, when the controller 444 intends to adjust the frequency of the internal reference signal $SIG_{AR}$, it is equivalent to adjusting the frequency ratio of the internal clock signal CLK_INN and the internal reference signal $SIG_{AR}$, so it only needs to increase or decrease the value of B to achieve the effect of increasing or decreasing the frequency of the internal reference signal $SIG_{AR}$.

Since the reference signal generator 442 can generate an internal reference signal $SIG_{AR}$ with the desired frequency using a logic circuit, the audio timing unit 440 requires a smaller circuit area than the audio timing unit 240 that uses a phase-locked loop to generate the internal reference signal $SIG_{AR}$.

In summary, the electronic device and the method for transmitting video data and audio data provided by the present disclosure can generate an internal reference signal having the same frequency as the audio clock signal used for playing audio data according to the reception status of the audio data, and can generate a cycle time stamp corresponding to the pixel clock signal of the output video data according to the internal reference signal. Therefore, when the receiving terminal receives the video data outputted by the electronic device, it can accurately re-generate the audio clock signal according to the cycle time stamp and the pixel clock signal of the video data, thereby reducing the phenomenon of burst of sound when playing audio data at the receiving terminal.

What is claimed is:

1. An electronic device, comprising:
a receiving unit, configured to receive a plurality of audio data and a plurality of first video data;
a signal processing unit, configured to generate a plurality of second video data according to the plurality of first video data, and generate a pixel clock signal configured to play the plurality of second video data;
a transmitting unit, configured to output the plurality of second video data, the plurality of audio data, the pixel clock signal and a cycle time stamp (CTS) to a receiving terminal, wherein a value obtained by dividing the frequency of the pixel clock signal by the CTS equals to a value obtained by dividing the frequency of an audio reference clock signal at the receiving terminal configured to play the plurality of audio data by a preset multiple; and
an audio timing unit, comprising:
a reference signal generator, configured to generate an internal reference signal; and
a controller, configured to adjust a frequency of the internal reference signal according to a speed at which the plurality of audio data is transmitted, and generate the CTS according to the preset multiple, the internal reference signal and the pixel clock signal.

2. The electronic device of claim 1, wherein:
when the frequency of the internal reference signal is less than a product of a sample rate and a sample multiple of the plurality of audio data, the controller controls the reference signal generator to increase the frequency of the internal reference signal; and
when the frequency of the internal reference signal is greater than the product of the sample rate and the sample multiple of the plurality of audio data, the controller controls the reference signal generator to decrease the frequency of the internal reference signal.

3. The electronic device of claim 1, wherein the audio timing unit further comprises:
a memory, configured to temporarily store the plurality of audio data;
wherein:
after the plurality of audio data has occupied a predetermined capacity of the memory, the controller retrieves one audio data of the plurality of audio data from the memory after every K cycles of the internal reference signal, wherein K is a positive integer;
when the plurality of audio data occupies a capacity of the memory exceeding a predetermined capacity upper limit, the controller increases the frequency of the internal reference signal, and when the plurality of audio data occupies a capacity of the memory less than a predetermined capacity lower limit, the controller decreases the frequency of the internal reference signal; and
the predetermined capacity upper limit is greater than the predetermined capacity, and the predetermined capacity is greater than the predetermined capacity lower limit.

4. The electronic device of claim 3, wherein the memory comprises a dynamic random access memory or a static random access memory.

5. The electronic device of claim 3, wherein the reference signal generator comprises a phase-locked loop, configured to generate the internal reference signal.

6. The electronic device of claim 1, wherein the audio timing unit further comprises a counter, and the controller is configured to:
increase a value of the counter by one whenever the receiving unit receives an audio data of the plurality of audio data;
after the value of the counter reaches a predetermined value, decrease the value of the counter by one every K cycles of the internal reference signal, wherein K is a positive integer;
increase the frequency of the internal reference signal when the value of the counter is greater than a predetermined upper limit value; and
decrease the frequency of the internal reference signal when the value of the counter is less than a predetermined lower limit;
wherein the predetermined upper limit is greater than the predetermined value, and the predetermined value is greater than the predetermined lower limit.

7. The electronic device of claim 6, wherein:
the controller estimates a detection time according to an internal clock signal, and calculates an amount of the plurality of audio data that the receiving unit receives during the detection time to determine a ratio of the frequency of the internal reference signal and the internal clock signal; and
the reference signal generator generates the internal reference signal according to the ratio and the internal clock signal, wherein the reference signal generator is a logic circuit.

8. The electronic device of claim 6, wherein the controller is further configured to:
after increasing the frequency of the internal reference signal, increase the frequency of the internal reference signal again when the value of the counter does not decrease; and
after decreasing the frequency of the internal reference signal, decrease the frequency of the internal reference signal again when the value of the counter does not increase.

9. The electronic device of claim 8, wherein the controller is further configured to:
after increasing the frequency of the internal reference signal, maintain the frequency of the internal reference signal when the value of the counter has decreased; and
after decreasing the frequency of the internal reference signal, maintain the frequency of the internal reference signal when the value of the counter has increased.

10. The electronic device of claim 1, wherein an image resolution corresponding to the plurality of second video data is greater than an image resolution corresponding to the plurality of first video data.

11. A method for transmitting video data and audio data, the method comprising:

receiving a plurality of audio data and a plurality of first video data;

generating a plurality of second video data and a pixel clock signal configured to play the plurality of second video data according to the plurality of first video data;

generating an internal reference signal;

adjusting a frequency of the internal reference signal according to a speed at which the plurality of audio data is transmitted;

generating a cycle time stamp (CTS) according to a preset multiple, the internal reference signal and the pixel clock signal; and outputting the plurality of second video data, the plurality of audio data, the pixel clock signal and the CTS to a receiving terminal, wherein a value obtained by dividing the frequency of the pixel clock signal by the CTS equals to a value obtained by dividing the frequency of an audio reference clock signal at the receiving terminal configured to play the plurality of audio data by the preset multiple.

12. The method of claim 11, wherein the step of adjusting the frequency of the internal reference signal according to the speed at which the plurality of audio data is transmitted comprises:

using the controller to control the reference signal generator to increase the frequency of the internal reference signal when the frequency of the internal reference signal is less than a product of a sample rate and a sample multiple of the plurality of audio data; and using the controller to control the reference signal generator to decrease the frequency of the internal reference signal when the frequency of the internal reference signal is greater than the product of a sample rate and a sample multiple of the plurality of audio data.

13. The method of claim 11, wherein the step of adjusting the frequency of the internal reference signal according to the speed at which the plurality of audio data is transmitted comprises:

storing the plurality of audio data to a memory;

retrieving one audio data of the plurality of audio data from the memory every K cycles of the internal reference signal, after the plurality of audio data has occupied a predetermined capacity of the memory, wherein K is a positive integer;

increasing the frequency of the internal reference signal when the plurality of audio data occupies a capacity of the memory exceeding a predetermined capacity upper limit; and decreasing the frequency of the internal reference signal when the plurality of audio data occupies a capacity of the memory less than a predetermined capacity lower limit;

wherein the predetermined capacity upper limit is greater than the predetermined capacity, and the predetermined capacity is greater than the predetermined capacity lower limit.

14. The method of claim 13, wherein the memory comprises a dynamic random access memory or a static random access memory.

15. The method of claim 13, wherein the step of generating the internal reference signal is using a phase-locked loop to generate the internal reference signal.

16. The method of claim 11, wherein the step of adjusting the frequency of the internal reference signal according to the speed at which the plurality of audio data is transmitted comprises:

increasing a value of the counter by one whenever the receiving unit receives an audio data of the plurality of audio data;

decreasing the value of the counter by one every K cycles of the internal reference signal, after the value of the counter reaches a predetermined value, wherein K is a positive integer;

increasing the frequency of the internal reference signal when the value of the counter is greater than a predetermined upper limit value; and decreasing the frequency of the internal reference signal when the value of the counter is less than a predetermined lower limit;

wherein the predetermined upper limit is greater than the predetermined value, and the predetermined value is greater than the predetermined lower limit.

17. The method of claim 16, wherein the step of generating the internal reference signal comprises:

estimating a detection time according to an internal clock signal;

calculating an amount of the plurality of audio data that the receiving unit receives during the detection time to determine a ratio of the frequency of the internal reference signal and the internal clock signal; and generating the internal reference signal according to the ratio and the internal clock signal.

18. The method of claim 16, wherein the step of adjusting the frequency of the internal reference signal according to the speed at which the plurality of audio data is transmitted further comprises:

after increasing the frequency of the internal reference signal, increasing the frequency of the internal reference signal again when the value of the counter does not decrease; and after decreasing the frequency of the internal reference signal, decreasing the frequency of the internal reference signal again when the value of the counter does not increase.

19. The method of claim 18, wherein the step of adjusting the frequency of the internal reference signal according to the speed at which the plurality of audio data is transmitted further comprises:

after increasing the frequency of the internal reference signal, maintaining the frequency of the internal reference signal when the value of the counter has decreased; and after decreasing the frequency of the internal reference signal, maintaining the frequency of the internal reference signal when the value of the counter has increased.

20. The method of claim 11, wherein an image resolution corresponding to the plurality of second video data is greater than an image resolution corresponding to the plurality of first video data.

* * * * *